United States Patent [19]
Comerford et al.

[11] 4,322,127
[45] Mar. 30, 1982

[54] SELF-ALIGNED PLUG CONNECTOR FOR OPTICAL FIBERS

[75] Inventors: Liam D. Comerford, Croton-on-Hudson; John S. Harper, Carmel; Eric G. Lean, Chappaqua, all of N.Y.

[73] Assignee: International Business Machines Corporation, Armonk, N.Y.

[21] Appl. No.: 108,776

[22] Filed: Dec. 31, 1979

[51] Int. Cl.³ .................................................. G02B 7/26
[52] U.S. Cl. .................................... 350/96.21; 264/1.5
[58] Field of Search ............... 350/96.20, 96.21, 96.22, 350/320; 264/1.5, 2.5

[56] References Cited

U.S. PATENT DOCUMENTS

| | | | |
|---|---|---|---|
| 3,936,143 | 2/1976 | Sato | 350/96.21 |
| 4,019,806 | 4/1977 | Fellows et al. | 350/96.21 |
| 4,113,346 | 9/1978 | Jackson et al. | 350/96.20 |
| 4,160,580 | 7/1979 | Le Noane et al. | 350/96.21 |
| 4,181,400 | 1/1980 | Malsot et al. | 350/96.21 |

FOREIGN PATENT DOCUMENTS 2456151  8/1976  Fed. Rep. of Germany ... 350/96.21

*Primary Examiner*—John D. Lee
*Attorney, Agent, or Firm*—Ronald L. Drumheller

[57] ABSTRACT

A casting is made of a corner having three mutually intersecting flat surfaces, one of which is perpendicular to the other two, while a fiber end is positioned against the corner in an orientation such that the end of the fiber butts against said one corner surface and the side surface of the fiber tangentially touches said other two corner surfaces. Two such castings, each carrying a fiber end, are aligned with each other in an alignment frame having two flat alignment surfaces which are oriented with respect to each other at the same orientation as the two corner surfaces which tangentially touch the fiber side surface. Since these orientations are the same, the castings fit precisely into the groove formed by the two flat alignment surfaces of the frame and can be moved toward each other until they touch. In this position the fiber ends carried by the castings are butt aligned.

12 Claims, 5 Drawing Figures

SELF-ALIGNED PLUG CONNECTOR FOR OPTICAL FIBERS

TECHNICAL FIELD

This invention relates to couplers for optical fibers and more specifically to self-aligned plug type connectors for optical fibers.

BACKGROUND OF THE INVENTION

Optically transparent glass and/or plastic fibers are being used advantageously in diverse areas of data communication and in other fields which require transfer of light energy between two locations. Such use has resulted in the need for convenient, reliable and efficient apparatus and techniques for coupling a pair of such fibers to each other. The difficulty in coupling optical fibers arises largely from their very small cross-section. In order to obtain highly efficient transfer of light energy from one optical fiber to another, the cores of the fibers must be positioned in axial alignment with each other and suitably close together. Since optical fiber cores typically have a diameter on the order of 50 μm, coupled optical fibers must be positioned with great precision. A further difficulty arises from the great fragility of such small hair-like fibers.

Optical fiber coupling apparatus and techniques found in the prior art are reviewed by C. Kleekamp and B. Metcalf in "Designer's Guide to Fiber Optics—Part 4," Electronic Design News, pages 51-62 (Mar. 5, 1978).

The coupling apparatus and techniques of the prior art may be divided into three types: the fiber splice; the alignment adjustable connector; and the self-aligned connector. A fiber splice is generally made by bringing two fibers into butted alignment through the use of a guiding structure. The two fibers and the guiding structure are then all permanently glued together in the aligned position with an index-matching adhesive. Guiding structures which have been used for splicing include V-shaped grooves, a square tube, and a bundle of three parallel rods which are 6.464 times larger in diameter than the fibers. The disadvantages of splices are that they form a permanent coupling of the fibers and that they are not generally convenient to install in the field.

Optical fiber connectors have the advantage that a permanent coupling is not made. Connectors are taught, for example, in U.S. Pat. Nos. 3,936,143 and 4,019,806. The disadvantages of adjustable connectors are their complexity and the inherent need to make a cumbersome manual adjustment which requires alignment monitoring apparatus. The need to make a manual alignment makes this type of connector very difficult to use in the field.

Optical fiber connectors which are automatically aligned are, in principle, readily usable in the field. Most use cylinders and cones to automatically align and hold the fibers. One approach is to use a concentric sleeve and locking nuts to align and hold two ferrules. Each ferrule carries an optical fiber in concentric relationship therewith. A bundle of three or four rods within the ferrule has been used to center the fiber within the ferrule. Unfortunately, concentric sleeve connectors are complex and expensive.

It is an object of this invention to provide a self-aligning optical fiber plug connector which has low optical energy loss even after many reconnection operations.

It is another object to provide such a connector at low cost.

Still another object is to provide a connector of this type which is simple to use and reliable, even in field use.

A further object is to provide a durable self-aligning optical fiber connector which also protects the fiber end from deterioration while the plug connection is being made as well as before and after connection.

It is also an object to provide a self-aligning optical fiber connector which avoids the use of reference surfaces which are rounded.

DISCLOSURE OF INVENTION

These and other objects and features of the present invention are achieved by casting a plug with flat surfaces onto fiber ends in order to provide flat reference surfaces for alignment within a cooperating frame. A mold is used to form a concave corner defined by three mutually intersecting flat surfaces, the third one of the defining surfaces being perpendicular to the line of intersection of the other two. A casting of the corner is then made while a fiber is positioned against the corner in an orientation such that the end of the fiber butts against the third defining surface while the first and second defining surfaces are both tangentially touching the side surface of the fiber, at least in the vicinity of the fiber end. The alignment frame has two flat alignment surfaces which are oriented to each other at the same angle as the first and second defining surfaces of the mold are oriented to each other. Since these angles are the same, a cast plug fits precisely into the groove formed by the two flat alignment surfaces of the frame. The cast reference surfaces of the plug which correspond to the first and second defining surfaces of the mold come into substantially uniform contact with the two flat alignment surfaces of the frame and precisely determine the position of the plug in two directions while allowing the plug still to be moved along the groove direction. Since the third defining surface of the mold is perpendicular to the line of intersection of the other two defining surfaces, the flat reference surface of the plug corresponding to the third defining surface is perpendicular to this direction. When two plugs are positioned in the same alignment frame, the third reference surfaces are parallel, so that the plugs may be positioned with the third reference surfaces facing and in contact with each other. In this position the optical fiber molded into the one plug becomes precisely aligned with and comes in butted contact with the optical fiber molded into the other plug facing it. The plugs may be mechanically held in this position by any suitable means, such as by springy clips.

DETAILED DESCRIPTION OF THE INVENTION

Figure 1:
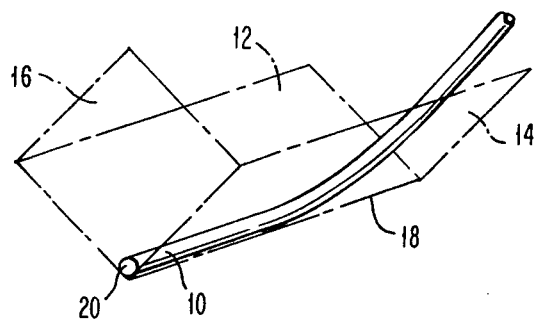
FIG. 1 shows an optical fiber end simultaneously tangent to three intersecting reference planes.

FIG. 1 illustrates how an optical fiber end 10 may simultaneously butt against a reference plane 16 while it tangentially touches two other reference planes 12, 14. Reference planes 12 and 14 are preferably perpendicular to each other, but they may intersect each other at either a larger or a smaller angle and fiber end 10 may still be tangent to both. Reference plane 16 must be substantially parallel with the end surface 20 of fiber end 10. Since optical fibers are most conveniently cleaved so that the end surface is perpendicular to the axis of the fiber and the axis of the fiber end is substantially parallel with the intersection 18 of planes 12 and 14, reference plane 16 is preferably perpendicular to line 18.

Figure 2:
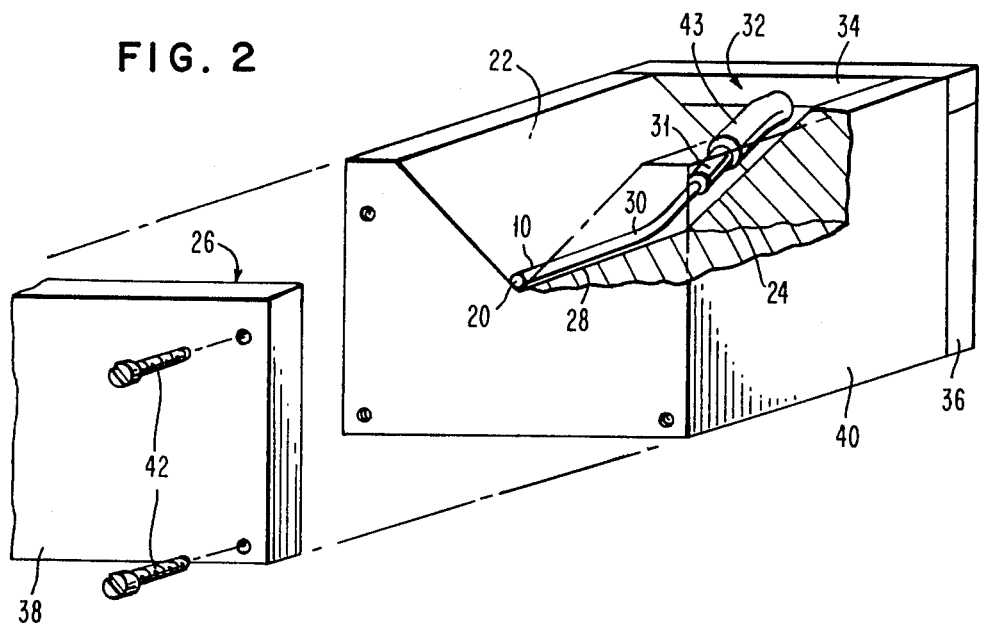
FIG. 2 is a partially cutaway perspective view of a partly disassembled mold which may be used to cast alignment plugs in accordance with this invention.

FIG. 2 shows a mold which may be used to cast an alignment plug onto an end of a fiber, the plug having reference surfaces corresponding to the reference planes of FIG. 1. Surfaces 22 and 24 correspond to reference planes 12 and 14 and define corresponding reference surfaces of a plug cast with the mold. Surfaces 22 and 24 also define an intersection 28 therebetween. Fiber 30 having a jacket 31 extends through the end wall 32 of the mold and an unjacketed end 10 thereof lies with the side surface thereof in tangential contact with surfaces 22 and 24. End wall 32 has two parts 34, 36, so that the fiber may be positioned with part 34 temporarily removed. It is also generally necessary to remove part 34 in order to remove a casting from the mold as will become more apparent. End surface 20 of the fiber is brought into contact with the opposing end wall 38 which has an inside surface 26 that corresponds to reference plane 16 and defines a corresponding reference surface of the casting.

End wall 38 is illustrated as a separate element which is attached to a vee-shaped mold portion 40 via screws 42. End wall 38 and/or end wall 32 or a part thereof alternatively may be formed integrally with portion 40. Mold portion 40 may also be fabricated in separate pieces. Preferably end wall 38 is optically transparent so that the position of fiber end 10 can be observed through end wall 38. It is possible to observe the butting of end surface 20 with surface 26 using interference techniques, for example. Fiber 30 either passes through end wall 32 at an acute angle to intersection line 28 or is redirected along this path (for example, by a rigid sleeve 43) so that the fiber must be bent back into an orientation parallel with line 28 through contact with surfaces 22,24. Fiber end 10 is held into contact with surfaces 22,24 by the elasticity of the fiber.

After the fiber is seated within the mold as shown, the mold is filled with a solidifying liquid such as potting epoxy (e.g., Stycast 2850 epoxy, Stycast being a trademark of Emerson & Cuming, Inc. of Canton, Mass.) to form a cast plug. In order to remove the casting from the mold, part 34 of the mold is removed. The mold may be coated with mold release compound ahead of time or differential expansion may be used after casting to release the plug from the mold.

Figure 3:
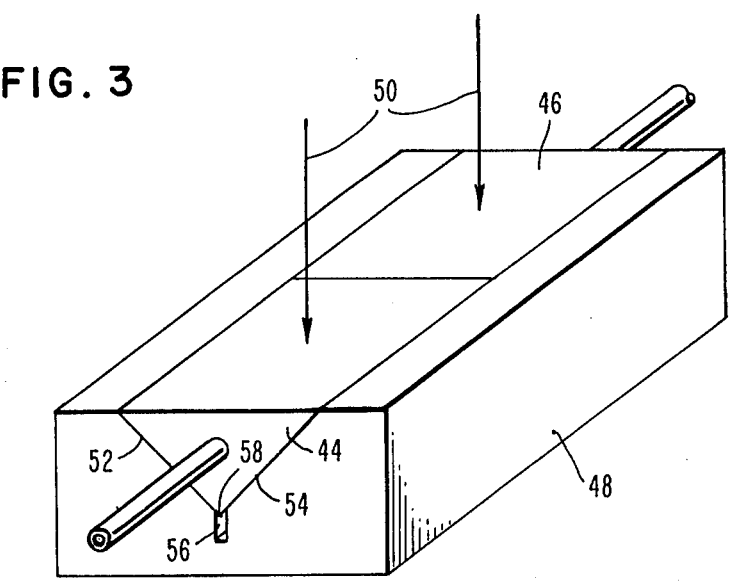
FIG. 3 illustrates a simple alignment frame and two cast plugs in perspective.

Two such cast plugs 44,46 which may be identical are shown in FIG. 3 seated within an alignment frame 48.

Alignment frame 48 has two alignment surfaces 52,54 which correspond with defining surfaces 22,24 of the mold. Alignment surfaces 52 and 54 intersect each other at precisely the same angle that defining surfaces 22 and 24 intersect each other so that the reference surfaces of plugs 44,46 which were formed by defining surfaces 22,24 broadly contact alignment surfaces 52,54 of the alignment frame. The plugs are oriented such that the reference surface of the plugs which were defined by end surface 26 of the mold contact each other. This brings the fiber end surfaces into a butted aligned relationship. Preferably the plugs are held into the alignment frame by force (indicated by arrows 50) generated in any convenient manner.

Alignment frame 48 preferably has a groove 56 extending along and corresponding with the intersection of alignment surfaces 52,54. The purpose of this groove is to protect the fragile fiber ends. The fibers are exposed along a large part of edge 58 of the plug formed by the intersection of the reference surfaces. Groove 56 serves to prevent edge 58 of the plugs from contacting either the alignment frame or any dirt which might collect within the frame.

BEST MODE FOR CARRYING OUT THE INVENTION

We prefer to cast the plugs using a novel magnetic casting apparatus which was conceived by two of us jointly with another individual. A patent application directed towards this casting apparatus was filed on Dec. 31, 1979 simultaneously herewith and is entitled "Magnetic Fiber Optic Casting Apparatus," now U.S. Pat. No. 4,244,681.

Figure 4:
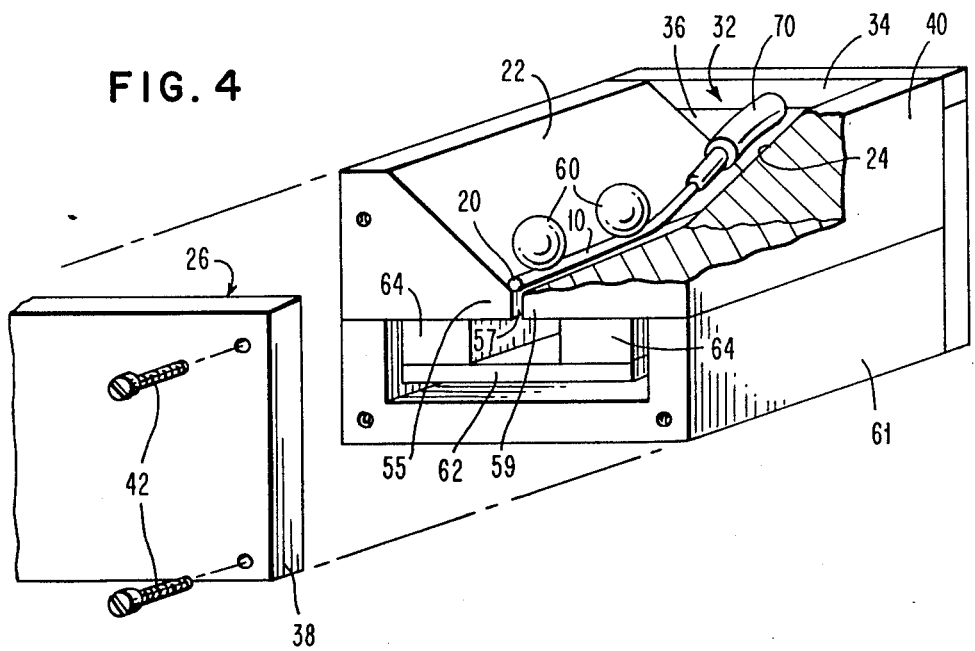
FIG. 4 is a partially cutaway perspective view of another partly disassembled mold which also may be used to cast alignment plugs in accordance with this invention.

This novel casting apparatus is shown in FIG. 4. Gap 57 extends completely through the vee-shaped groove structure 40 to divide it into separate pole pieces 55,59. Pole pieces 55,59 are composed of a magnetic material (e.g., tool steel) and are supported by a frame 61 and end walls 32,38 which are not composed of a magnetic material. Wall 38 is preferably made of glass while wall parts 34,36 and frame 61 may be made of brass, for example.

Pole pieces 55,59 cooperate with permanent magnets 64 and iron shunt 62 to concentrate magnetic flux across gap 57 so as to attract spheres 60 (which are also composed of magnetic material) towards gap 57 and into the vee-shaped groove. Spheres 60 forceably seat the fiber end 10 into contact with surfaces 22,24. The diameter of the spheres is preferably such that when they are in contact with one of the walls 22,24 and the seated fiber end 10, they are only very slightly spaced from the other of the surfaces 22,24. Obviously the width of gap 57 must be less than the diameter of the fiber. The molding material preferably should have a viscosity such that it does not flow appreciably through gap 57. It should be apparent that gap 57 may contain a material which is not magnetic (i.e., a dielectric). Such material may serve as a spacer for positioning pole pieces 55,59.

A bent strain relief tube 70 allows the fiber contained within it to be directed towards the intersection of surfaces 22,24 while still allowing the fiber to exit the molded plug in a direction perpendicular to end wall 32. The strain relief tube 70 extends for a short distance outside of the mold to strain relieve the fiber. Shrink tubing 72 (shown in FIG. 5) joins the fiber with the strain relief tubing and further relieves strain.

Figure 5:
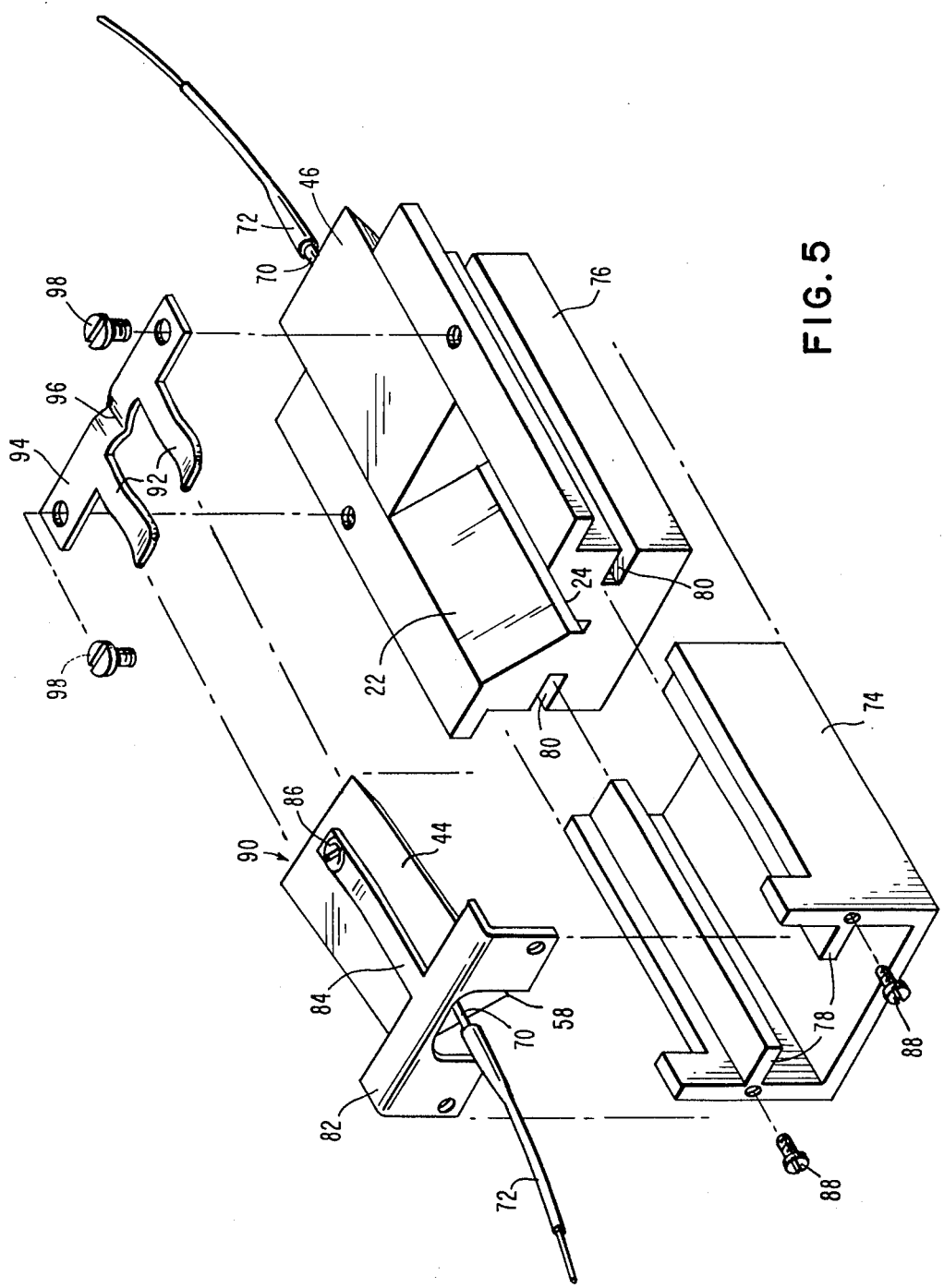
FIG. 5 is a perspective illustration of a partly disassembled connector in accordance with the present invention.

A practical alignment frame is illustrated in FIG. 5. The alignment frame has two frame parts 74,76 which slidably connect together by endwise inserting rails 78 into grooves 80.

Element 82 supports one of the molded plugs 44 via a springy arm 84 and screw 86. Element 82 in turn is supported by frame part 74 via screws 88. The length of frame part 74 is such that the rails 78 must be partly inserted within grooves 80 before the end surface of the plug reaches frame part 76. Arm 84 furthermore holds plug 44 at a slightly inclined angle so that the forward portion of the plug edge 58 (which contains the fiber end portion) is above the intersection of surfaces 22,24, while the rear portion of the plug edge 58 is below this intersection. As a result, the fiber tip cannot come in contact with frame part 76 when the parts are slid together. At some point in the connection process, however, the reference surfaces of plug 44 will contact the leading edge of surfaces 22,24 and cause plug 44 to be tipped back down into alignment with frame part 76. When the two parts 74,76 have been joined, fingers 92 of springy element 94 exert a down force on plug 44, which maintains plug 44 in a seated position within the alignment frame. Dimple 96 of element 94 simultaneously exerts a down force on plug 46 for the same purpose. Screws 98 mount element 94 to frame part 76. The upturned tips of fingers 92 allow plug 44 to be pushed under fingers 92 during reconnection of the frame parts. It should be appreciated that frame part 74 furthermore protects the critical edge 58 of plug 44 even while the alignment parts 74,76 are apart.

Having thus described our invention, what we claim as new, and desire to secure by Letters Patent is:

1. An optical fiber plug connector, comprising:
   a first molded plug having first and second flat exterior surfaces defining an angle therebetween and having a third flat exterior surface perpendicular to said first and second surfaces, said first plug being molded onto a first optical fiber end, said first fiber end having an end surface and a side surface adjacent thereto, said side surface of said first fiber end being tangent with said first and second surfaces of said first plug and said end surface of said first fiber end coinciding with said third surface of said first plug;
   a second molded plug having first and second flat exterior surfaces oriented with respect to each other at said defined angle and having a third flat exterior surface perpendicular to said first and second surfaces of said second plug, said second plug being molded onto a second optical fiber end, said second fiber end having an end surface and a side surface adjacent thereto, said side surface of said second fiber end being tangent with said first and second surfaces of said second plug and said end surface of said second fiber end coinciding with said third surface of said second plug; and
   an alignment frame having first and second flat alignment surfaces oriented with respect to each other at said defined angle, such that said first alignment surface may broadly contact said first surfaces of said first and second plugs to thereby bring said first surfaces into coplanarity while at the same time said second alignment surface broadly contacts said second surfaces of said first and second plugs to thereby bring said second surfaces also simultaneously into coplanarity, said first and second plugs being slidable toward each other until said third surfaces of said first and second plugs also simultaneously broadly contact each other, said end surfaces of said first and second optical fiber ends being thereby butt aligned with each other.

2. An optical fiber connector as defined in claim 1 wherein said first and second surfaces of said first plug intersect each other and said first and second surfaces of said second plug intersect each other.

3. An optical fiber connector as defined in claim 2 wherein said first, second and third surfaces of said first plug form a first corner and said first, second and third surfaces of said second plug form a second corner, said first and second corners being similar.

4. An optical fiber connector as defined in claim 3 wherein said defined angle is about 90 degrees.

5. An optical fiber plug connector as defined in claim 3 wherein said first and second alignment surfaces intersect each other.

6. An optical fiber plug connector as defined in claim 3 wherein said first and second alignment surfaces intersect each other at a groove, said groove preventing contact of said first and second fiber ends with said alignment frame.

7. An optical fiber plug connector as defined in claim 6 wherein said alignment frame comprises a first part having said first and second alignment surfaces and a second part which slidably connects with said first part, said second part carrying said second plug and said first part carrying said first plug.

8. An optical fiber plug connector as defined in claim 7 wherein said second part carries said second plug in an orientation such that said second fiber end is protected from accidental contact with said first part while sliding said second part into connection with said first part.

9. An optical fiber plug connector as defined in claim 8 wherein said second plug is carried by said second part at the end of a springy arm, said springy arm forcing said second plug against said first and second alignment surfaces during connection of said first and second parts.

10. An optical fiber plug connector as defined in claim 8 wherein said first and second plugs are forcibly seated against said first and second alignment surfaces.

11. An optical fiber plug connector as defined in claim 1 wherein said first and second plugs are forcibly seated against said first and second alignment surfaces.

12. A method of connecting optical fibers, comprising the steps of:
   molding a first plug onto a first optical fiber end, said first molded plug having first and second flat exterior surfaces defining an angle therebetween and having a third flat exterior surface perpendicular to said first and second surfaces, said first fiber end having an end surface and a side surface adjacent thereto, said side surface of said first fiber end being tangent with said first and second surfaces of said first plug and said end surface of said first fiber end coinciding with said third surface of said first plug;
   molding a second plug onto a second optical fiber end, said second molded plug having first and second flat exterior surfaces oriented with respect to each other at said defined angle and having a third flat exterior surface perpendicular to said first and second surfaces of said second plug, said second fiber end having an end surface and a side surface adjacent thereto, said side surface of said second fiber end being tangent with said first and second surfaces of said second plug and said end surface of said second fiber end coinciding with said third surface of said second plug;

positioning said first and second plugs in an alignment frame having first and second flat alignment surfaces oriented with respect to each other at said defined angle, such that said first alignment surface broadly contacts said first surfaces of said first and second plugs to thereby bring said first surfaces into coplanarity while at the same time said second alignment surface broadly contacts said second surfaces of said first and second plugs to thereby bring said second surfaces also simultaneously into coplanarity; and sliding said first and second plugs together within said alignment frame to thereby bring said third surfaces of said first and second plugs also into simultaneous broad contact with each other, said end surfaces of said first and second optical fiber ends thereby butt aligning with each other.

* * * * *